United States Patent
Kawarabata et al.

(10) Patent No.: US 6,867,914 B2
(45) Date of Patent: Mar. 15, 2005

(54) ULTRAVIOLET MICROSCOPE

(75) Inventors: Ken Kawarabata, Kawasaki (JP); Jiro Mizuno, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/305,131

(22) Filed: Nov. 27, 2002

(65) Prior Publication Data

US 2003/0099035 A1 May 29, 2003

(30) Foreign Application Priority Data

Nov. 28, 2001 (JP) ........................................ 2001-362481

(51) Int. Cl.[7] .............................................. G02B 21/00
(52) U.S. Cl. ....................... 359/381; 359/368; 359/384; 359/388
(58) Field of Search ................................ 359/368–398; 355/402, 53

(56) References Cited

U.S. PATENT DOCUMENTS

| | | |
|---|---|---|
| 4,801,352 A | 1/1989 | Piwczyk |
| 5,430,303 A | 7/1995 | Matsumoto et al. |
| 5,481,401 A * | 1/1996 | Kita et al. .................. 359/353 |
| 5,559,584 A | 9/1996 | Miyaji et al. |
| 6,452,723 B1 * | 9/2002 | Suenaga et al. ............ 359/356 |
| 6,633,364 B2 | 10/2003 | Hayashi |

FOREIGN PATENT DOCUMENTS

| | | |
|---|---|---|
| JP | 56-151912 | 11/1981 |
| JP | 9-162117 | 6/1997 |
| JP | 2002-92704 | 10/2000 |
| JP | 2000-292704 | 10/2000 |

OTHER PUBLICATIONS

U.S. Appl. No. 10/133,626, filed Apr. 29, 2000, Tsurumune et al.

* cited by examiner

Primary Examiner—Drew A. Dunn
Assistant Examiner—Joshua L Pritchett

(57) ABSTRACT

An ultraviolet microscope comprises an illumination optical system that guides ultraviolet light emitted from a light source to a specimen; and an observation optical system through which the specimen is observed. The illumination optical system and the observation optical system are set within an inert gas atmosphere.

13 Claims, 6 Drawing Sheets

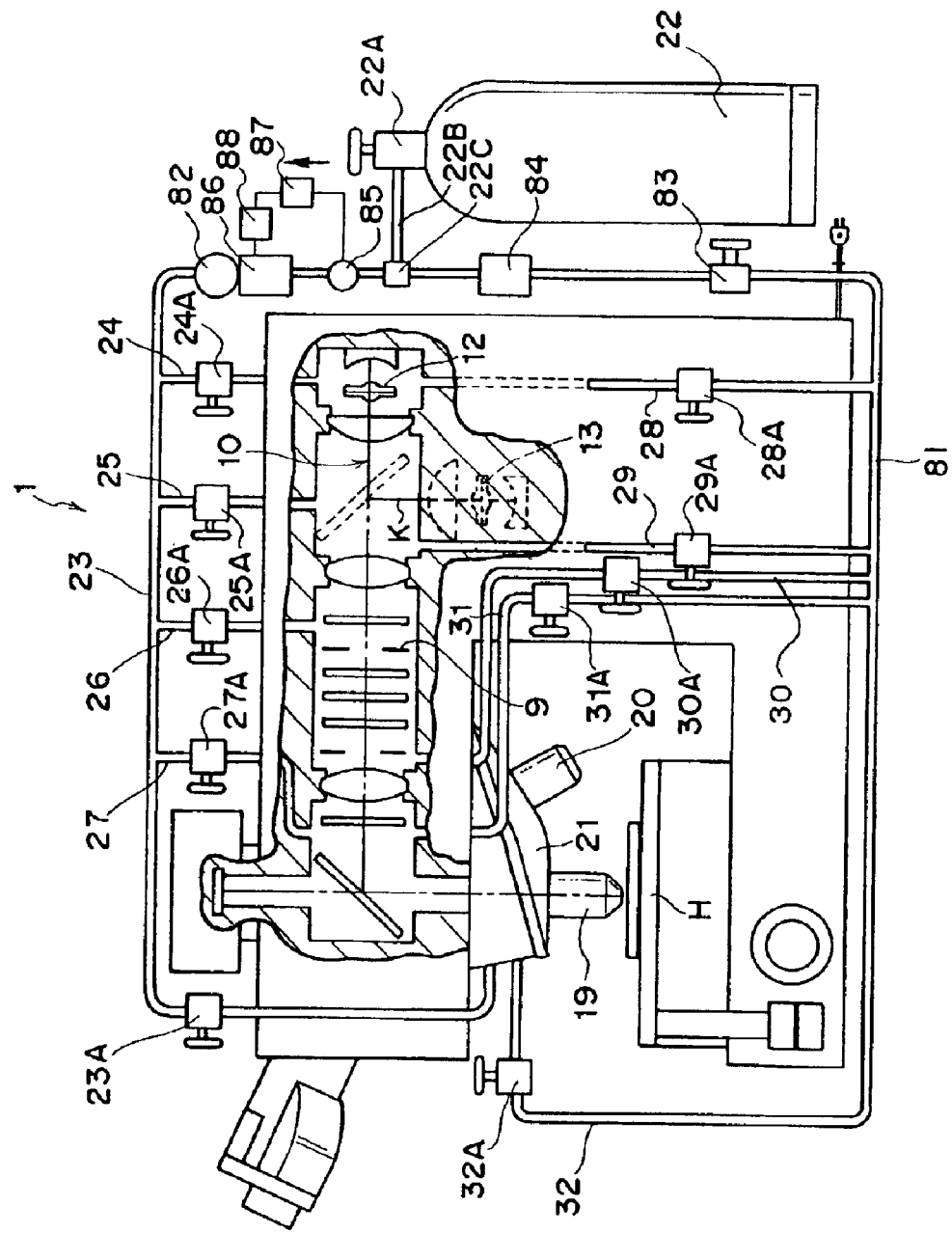

ULTRAVIOLET MICROSCOPE

INCORPORATION BY REFERENCE

The disclosure of the following priority application is herein incorporated by reference:
Japanese Patent Application No. 2001-362481 filed Nov. 28, 2001

BACKGROUND OF THE INVENTION

1. Field of the Invention

The present invention relates to an ultraviolet microscope and more specifically, it relates to an ultraviolet microscope in which a photochemical reaction between ultraviolet light emitted from a light source in an illumination optical system and a contaminant in the atmosphere in the optical path is prevented.

2. Description of the Related Art

There are ultraviolet microscopes through which a specimen is observed by using light in the ultraviolet range or in the deep ultraviolet range (collectively referred to as ultraviolet light). Ultraviolet light in the deep ultraviolet range (deep ultraviolet light) in particular, has a small wavelength and has high energy. When observing or inspecting a specimen through an ultraviolet microscope, a photochemical reaction between contaminants that are not chemically stable contained in the atmosphere at the optical path of the ultraviolet microscope and deep ultraviolet light emitted from a light source may be induced.

The reaction product resulting from the photochemical reaction between the contaminants and the deep ultraviolet light becomes adhered to the surfaces of optical components such as the objective in the optical path of the ultraviolet microscope. The reaction product then causes clouding of the surfaces, which, in turn, leads to lowered optical performance and more specifically, lowered transmittance. The optical components become more clouded as time elapses while the specimen is observed through the ultraviolet microscope.

Accordingly, measures against clouding are taken by, for instance, washing the optical components of the ultraviolet microscope before they are assembled or as they are used as assembled parts of the ultraviolet microscope. However, depending upon the type of reaction product resulting from a photochemical reaction, the reaction product cannot always be washed off the optical components. For this reason, the product life of the optical components of the ultraviolet microscope is bound to be shorter than that of optical components in microscopes that use visible light as the light source.

SUMMARY OF THE INVENTION

The present invention is to provide an ultraviolet microscope in which it is possible to prevent the optical performance from becoming lowered due to an occurrence of a photochemical reaction.

An ultraviolet microscope according to the present invention comprises an illumination optical system that guides ultraviolet light emitted from a light source to a specimen; and an observation optical system through which the specimen is observed and the illumination optical system and the observation optical system are set within an inert gas atmosphere.

It is preferable that the observation optical system includes an ultraviolet light objective and an image-forming optical system; a lens barrel for housing the illumination optical system and the image-forming optical system is further provided; and spaces inside the lens barrel and inside the ultraviolet light objective are filled with the inert gas atmosphere.

A temperature control apparatus that controls temperature of the inert gas supplied into the ultraviolet light objective and the lens barrel may be provided. It is preferable that the temperature control apparatus includes a temperature detector that detects the temperature of the inert gas supplied from a gas source into the lens barrel and the ultraviolet light objective and a temperature regulator that adjusts the temperature of the inert gas, and drives the temperature regulator so as to adjust the temperature of the inert gas detected by the temperature detector to a reference temperature.

It is possible to further provide a circulating path achieved by connecting a supply pipe through which the inert gas is supplied from the gas source into the lens barrel with a discharge pipe through which the inert gas is discharged from the lens barrel to circulate the inert gas; a circulating device provided at the circulating path, which circulates the inert gas; and a filter provided at the circulating path, which catches contaminants remaining in the inert gas.

It is desirable that an ultraviolet microscope further comprises a supply pipe through which the inert gas from a gas source is supplied into the lens barrel; a mounting member provided at the lens barrel and having an ultraviolet mounting portion at which the ultraviolet light objective is detachably mounted; a communicating hole formed near the ultraviolet mounting portion of the mounting member, through which the inert gas is guided into the ultraviolet light objective when the ultraviolet light objective is mounted at the ultraviolet mounting portion; and an inert gas passage formed at the lens barrel, which communicates between the supply pipe and the communicating hole, and that the inert gas is supplied into the ultraviolet light objective via the communicating hole and the gas passage. The mounting member may be formed as a nosepiece that rotates relative to the lens barrel and further includes a sliding surface that comes into contact with and slides against the lens barrel and a visible light mounting portion at which a visible light objective may be detachably mounted. A seal member may be provided between the lens barrel and the sliding surface so as to prevent leakage of the inert gas.

It is desirable that the inert gas is nitrogen gas.

The lens barrel includes a plurality of chambers defined by a plurality of lenses constituting the illumination optical system; and it is preferable that the inert gas is supplied into the plurality of chambers inside the lens barrel individually.

The ultraviolet light objective includes a plurality of lenses individually held by a holding frame and a lens body securing the holding frame, with a plurality of lens chambers formed between the plurality of lenses. It is desirable that a flow path communicating with the communicating hole formed at the mounting member is provided at the lens body; and that the plurality of lens chambers are made to communicate with each other through holes formed at the holding frame. The ultraviolet light objective may further include a shutter that opens/closes the flow path.

BRIEF DESCRIPTION OF THE DRAWINGS

FIG. 6 is a side elevation (a partial sectional view), showing the overall structure adopted in an ultraviolet microscope achieved in a third embodiment of the present invention.

DESCRIPTION OF THE PREFERRED EMBODIMENTS

First Embodiment

Figure 1:
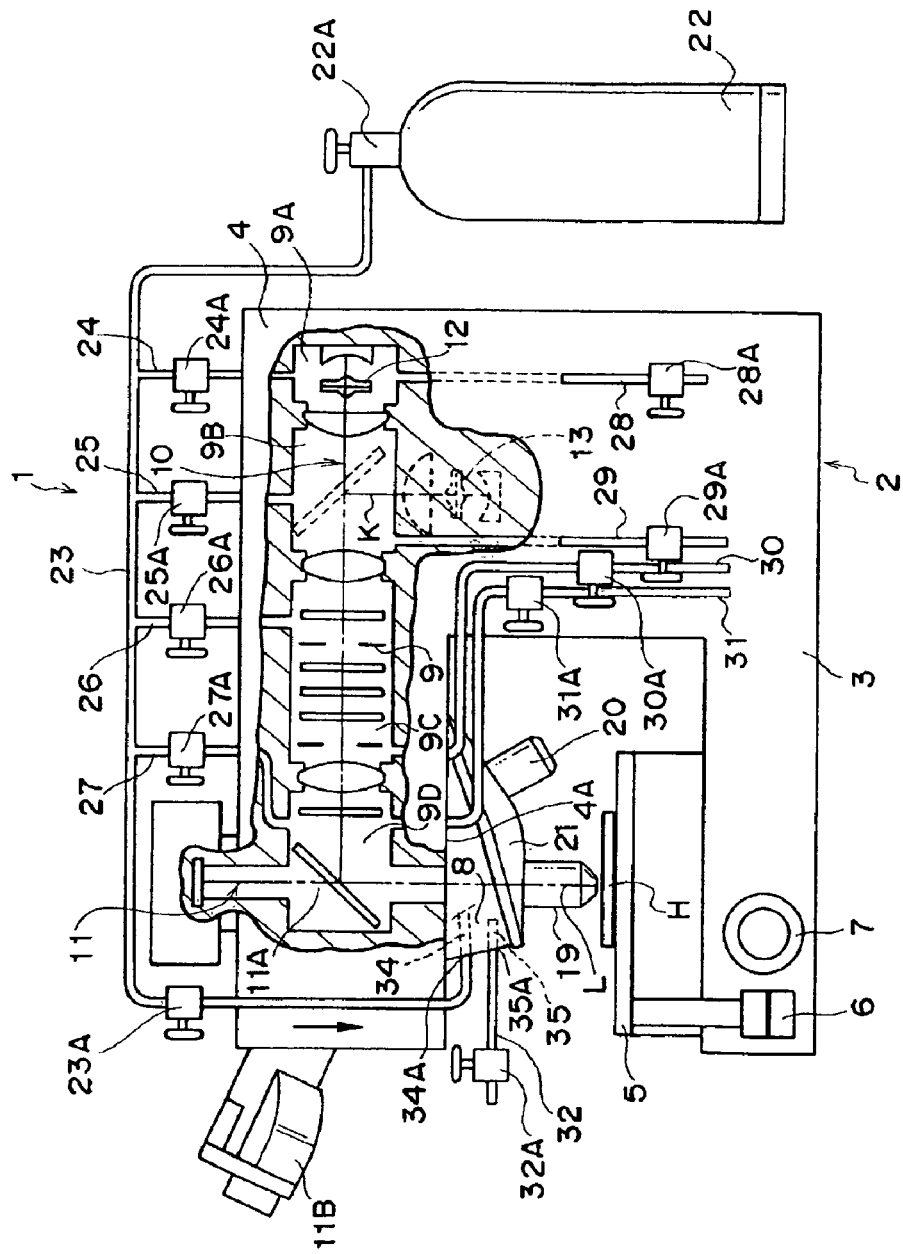
FIG. 1 is a side elevation (a partial sectional view), showing the overall structure adopted in an ultraviolet microscope achieved in a first embodiment of the present invention.
Figure 2:
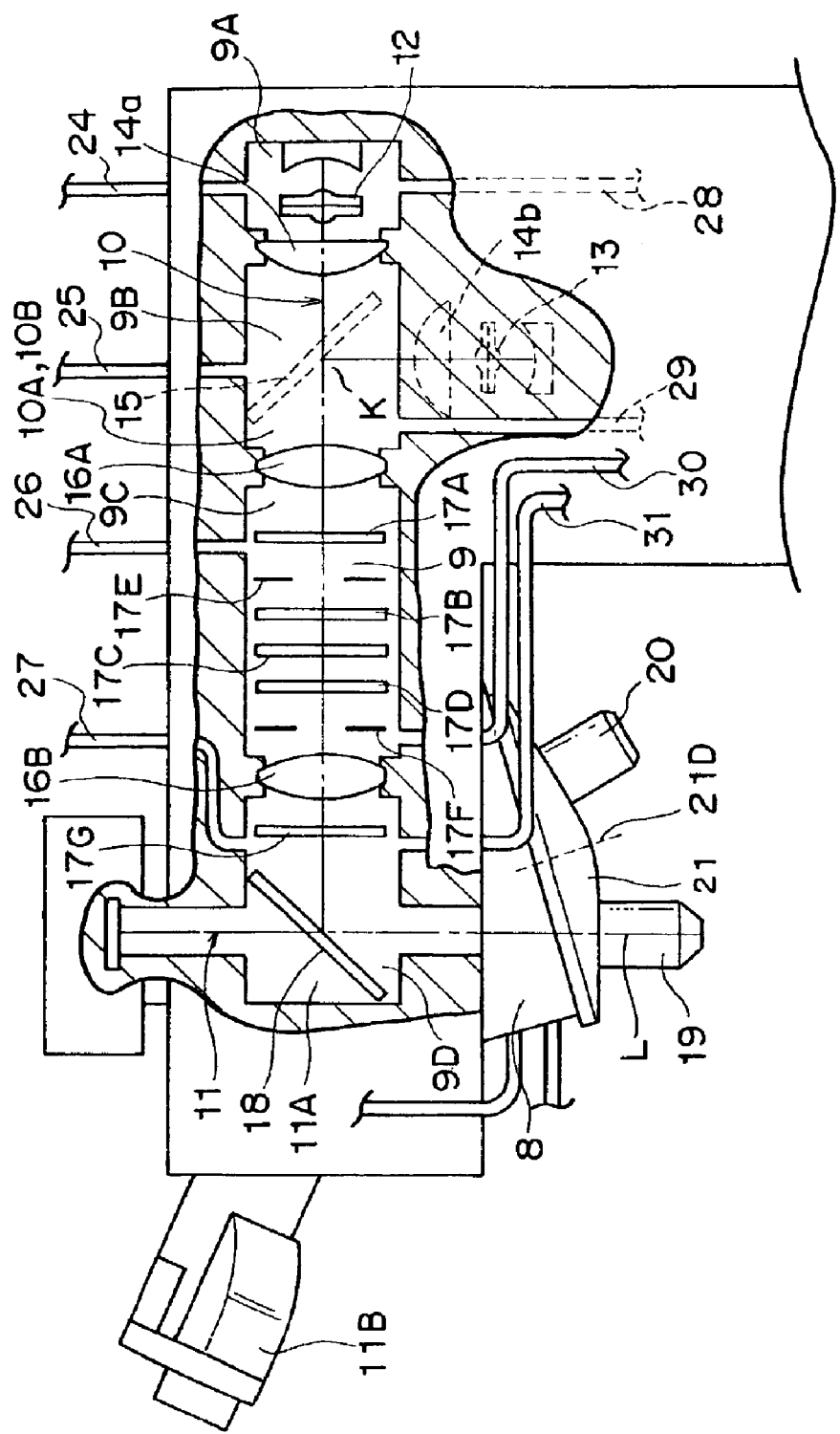
FIG. 2 is a sectional view of the structure assumed inside the lens barrel of the ultraviolet microscope shown in FIG. 1.

The following is an explanation of the ultraviolet microscope achieved in the first embodiment of the present invention, given in reference to the drawings. FIG. 1 is a side elevation (a partial sectional view) of the ultraviolet microscope achieved in the first embodiment. FIG. 2 shows the structure assumed inside the lens barrel of the ultraviolet microscope in FIG. 1.

As shown in FIG. 1, an ultraviolet microscope 1 includes an upright body 2 which is formed in a roughly U-shape. The body 2 includes a base unit 3 and a microscope main unit 4 which stands facing opposite the base unit 3. The base unit 3 includes a stage 5 on which a specimen (sample) H is placed, a stage handle 6 that is operated to move the stage 5 to the left and the right in FIG. 1, i.e., along the horizontal direction, and a vertical handle 7 operated to move the stage 5 up and down.

A lens barrel 9, which is to be detailed later, is internally provided at the microscope main unit 4. A supporting member 8 that supports objectives 19 and 20 is secured to a lower surface 4A of the microscope main unit 4, which faces the base unit 3. The ultraviolet microscope 1 comprises an illumination optical system 10 that guides light irradiated from a light source to the objectives 19 and 20 and an observation optical system 11 through which the specimen H is observed. The illumination optical system 10 and the observation optical system 11 are housed inside the lens barrel 9. It is to be noted that the ultraviolet microscope 1 according to the present invention enables a visible light observation through which the specimen H is observed with visible light as well as an ultraviolet light observation through which the specimen H is observed with ultra violet light.

As shown in FIG. 2, the illumination optical system 10 is constituted of an ultraviolet light illumination optical system 10A having an origin point thereof at a first light source 12 which generates ultraviolet light, a visible light illumination optical system 10B having an origin point thereof at a second light source 13 that generates visible light and the objectives 19 and 20 that function as condenser lenses.

The ultraviolet light illumination optical system 10A includes the first light source 12, a collector lens 14a, a first lens 16A, a second lens 16B and a half-mirror 18. Filters 17A, 17B, 17C and 17D and apertures 17E and 17F are provided between the first lens 16A and the second lens 16B. To the front of the second lens 16B along the direction in which ultraviolet light advances, i.e., between the second lens 16B and the half-mirror 18, a filter 17G is provided. The area space further toward the light source 12 relative to the collector lens 14a in this structure is referred to as a first chamber 9A, the space between the collector lens 14a and the first lens 16A is referred to as a second chamber 9B, the space between the first lens 16A and the second lens 16B is referred to as a third chamber 9C and the space further toward the half-mirror 18 relative to the second lens 16B is referred to as a fourth chamber 9D.

The first light source 12, which generates ultraviolet light in the deep ultraviolet range with a particularly small wavelength (deep ultraviolet light), is constituted of an ultraviolet light source such as a mercury-xenon lamp, a mercury lamp or a UV laser. By definition, deep ultraviolet light has a wavelength equal to or less than approximately 300 nm, e.g., 193 nm, 248 nm, or 266 nm. However, the specific wavelength of the deep ultraviolet is not limited to these examples.

The deep ultraviolet light emitted from the light source 12 is condensed at the collector lens 14a, passes through the first lens 16A, the filter 17A, the aperture 17E, the filters 17B, 17C and 17D, the aperture 17F, the second lens 16B and the filter 17G and then is reflected at the half-mirror 18. The deep ultraviolet light reflected at the half-mirror 18 is then guided to the objective 19 for deep ultraviolet light.

The visible light illumination optical system 10B includes the second light source 13 that generates visible light, a collector lens 14b and a half-mirror 15. The second light source 13 which may be constituted of, for instance, a halogen lamp generates visible light. Visible light emitted from the light source 13 is condensed at the collector lens 14b and is reflected at the half-mirror 15. Subsequently, the visible light passes through the first lens 16A, the filter 17A, the aperture 17E, the filters 17B, 17C and 17D, the aperture 17F, the lens 16B and the filter 17G and is reflected at the half-mirror 18. The visible light reflected at the half-mirror 18 is guided to the objective 20 for visible light.

As described above, the light generated at the first light source 12 and the light generated at the second light source 13 have different wavelengths. It is to be noted that the half-mirror 18 reflects the ultraviolet light from the 12 and the visible light from the 13 toward the objectives 19 and 20 and also allows the ultraviolet light and the visible light from the objectives 19 and 20 to be transmitted.

The observation optical system 11 is constituted of one objective selected from a plurality of objectives, i.e., a single objective selected from the deep ultraviolet light objective 19 and the visible light objective 20 in this example, and an image-forming optical system 11A of the known art having an image-forming lens and the like. The image-forming optical system 11A includes an eyepiece 11B through which the operator is allowed to observe the specimen H with ultraviolet or visible light.

The objectives 19 and 20 achieving magnifying powers different from each other are constituted of materials suited to the wavelengths of the corresponding types of light. For instance, the deep ultraviolet light objective 19 may be constituted of quartz. The objectives 19 and 20 are detachably mounted at a revolving nosepiece 21. The nosepiece 21 is provided at the supporting member 8 so as to rotate freely around an axis 21D. The axis 21D of the nosepiece 21 forms a predetermined angle relative to the optical axis L of the deep ultraviolet light and the visible light. By rotating the nosepiece 21, either the deep ultraviolet light objective 19 or the visible light objective 20 is selected and the selected objective is then set on the optical axis L.

An ultraviolet light observation through which the specimen H is observed with ultraviolet light achieves a higher resolution than a visible light observation in which the specimen H is observed with visible light. However, particularly when light with a small wavelength such as deep ultraviolet light is used for observation, a photochemical reaction between the deep ultraviolet light and contaminants within the atmosphere at the optical path of the ultraviolet microscope 1, e.g., ammonia, amines and ester phthalate may occur. A reaction product resulting from such a photochemical reaction will lower the optical performance of the optical components and, more specifically, the transmittance of the optical components and ultimately reduces the product life of the optical components. Accordingly, the present invention prevents an occurrence of a photochemical reaction between the deep ultraviolet light and contaminants by supplying an inert gas such as nitrogen into the atmosphere at the optical path in the ultraviolet microscope 1.

As shown in FIG. 1, a gas source 22 that supplies an inert gas, i.e., nitrogen gas achieving a high degree of purity in this example, is connected to the ultraviolet microscope 1. One end of a gas supply pipe 23 is connected to a valve 22A mounted at the gas source 22. The other end of the gas supply pipe 23 is connected to a supply-side gas passage 34 at the supporting member 8 via a valve 23A. The structure of the supporting member 8 is to be detailed later.

Four branch supply pipes 24~27 are connected to the supply pipe 23 at positions between the valves 22A and 23A.

One end of the first branch supply pipe 24 is connected to the supply pipe 23 via a valve 24A and the other end of the first branch supply pipe 24 is connected to the first chamber 9A in the lens barrel 9. One end of the second branch supply pipe 25 is connected to the supply pipe 23 via a valve 25A and the other end is connected to the second chamber 9B in the lens barrel 9. One end of the third branch supply pipe 26 is connected to the supply pipe 23 via a valve 26A and the other end is connected to the third chamber 9C in the lens barrel 9. One end of the fourth branch supply pipe 27 is connected to the supply pipe 23 via a valve 27A and the other end is connected to the fourth chamber 9D in the lens barrel 9.

In addition, one end of a first discharge pipe 28 is connected via a valve 28A to the first chamber 9A so as to discharge the nitrogen gas inside the chamber through the first discharge pipe 28. The other end of the first discharge pipe 28 is left open. Likewise, one end of a second discharge pipe 29 is connected via a valve 29A to the second chamber 9B with the other end of the second discharge pipe 29 left open. A third discharge pipe 30 is connected via a valve 30A to the third chamber 9C with the other end of the third discharge pipe 30 left open. One end of a fourth discharge pipe 31 is connected via a valve 31A to the fourth chamber 9D with the other end of the fourth discharge pipe 31 left open.

It is to be noted that one end of a fifth discharge pipe 32 is connected via a valve 32A to a discharge-side gas passage 35 at the supporting member 8, with the other end of the fifth discharge pipe 32 left open.

The supply pipe 23, the first~fourth branch supply pipes 24~27 and the first~fifth discharge pipes 28~32 may be constituted of, for instance, Teflon ("Teflon" is the trademark), and stainless steel or the like is used to form portions that need to be strong. These pipings are pre-washed.

Figure 3:
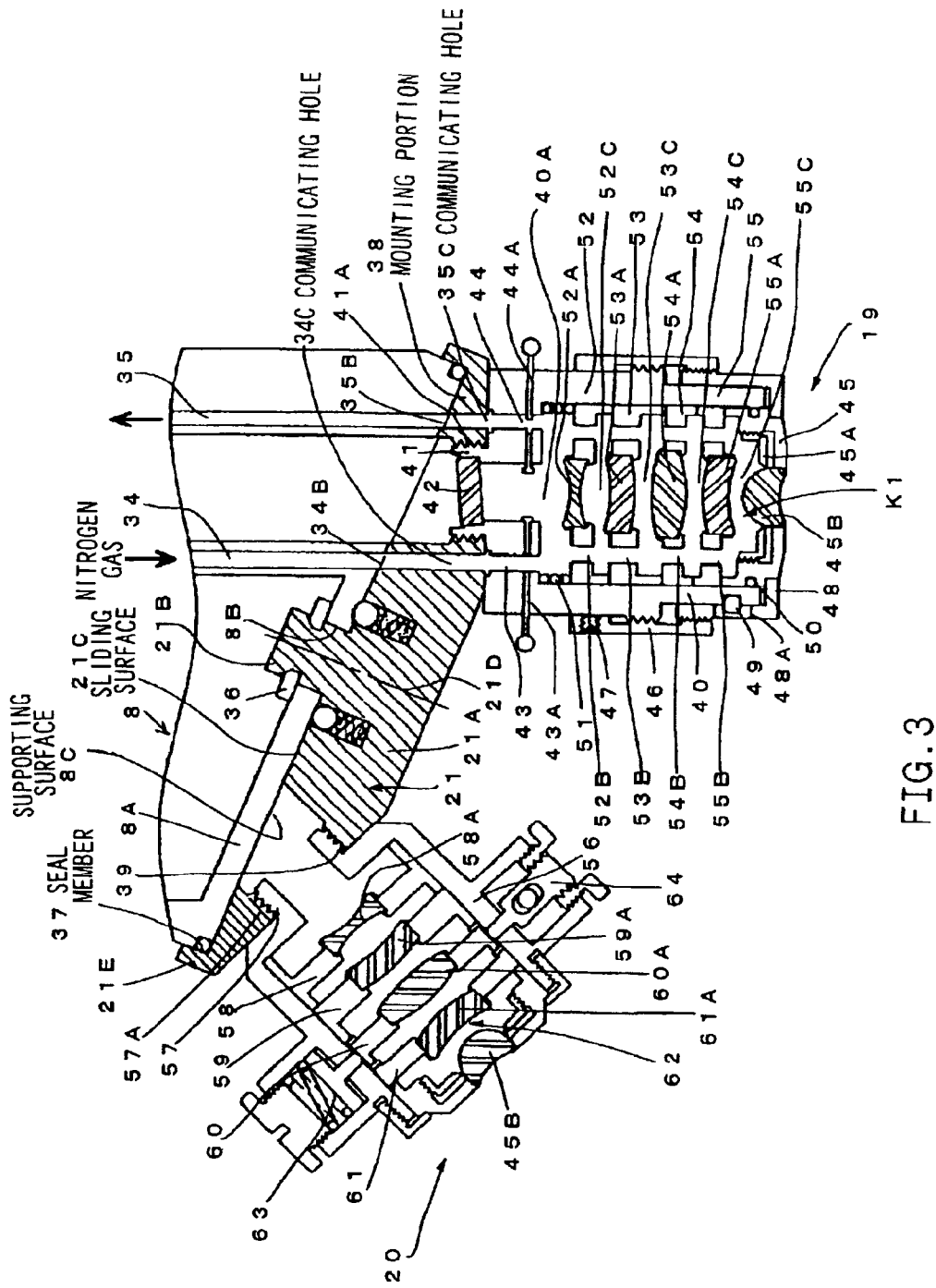
FIG. 3 is a sectional view of the structures of the objective and the nosepiece.

FIG. 3 is a sectional view showing the structures of the supporting member 8, the nosepiece 21, the deep ultraviolet light objective 19 and the visible light objective 20. It is to be noted that FIG. 3 shows the deep ultraviolet light objective 19 set on the optical axis L (on the observation optical path).

As shown in FIG. 3, the supporting member 8 includes at the bottom thereof a disk portion 8A having formed therein a mounting hole 8B at which the nosepiece 21 is mounted. The surface of the disk portion 8A that comes in contact with the nosepiece 21 is referred to as a supporting surface 8C. At the supporting member 8 toward the optical axis L, the supply-side gas passage 34 through which nitrogen gas is supplied and the discharge-side gas passage 35 through which the nitrogen gas is discharged are provided. One end 34A (see FIG. 1) of the supply-side gas passage 34 is connected to the supply pipe 23, with the other end 34B opening at the supporting surface 8C. One end 35A (see FIG. 1) of the discharge-side gas passage 35 is connected to the fifth discharge pipe 32 and the other end 35B opens at the supporting surface 8C.

The nosepiece 21 includes a disk portion 21A, a cylindrical projection 21B formed at the center of the disk portion 21A as an integrated part, a sliding surface 21C coming in contact with the supporting surface 8C of the supporting member 8 and a flange portion 21E formed at the periphery of the disk portion 21A. The cylindrical projection 21B is supported at the mounting hole 8B of the supporting member 8 via a seal member 36 constituted of a fluoro-rubber or the like and formed in a disk shape so as to be allowed to rotate around the axis 21D. At this point, the flange portion 21E comes to contact with an external circumferential surface of the disk portion 8A of the supporting member 8 at an internal circumferential surface thereof.

As described above, the nosepiece 21 is mounted at the supporting member 8 so as to be allowed to rotate around the axis 21D. As the nosepiece 21 rotates, the sliding surface 21C slides against the supporting surface 8C.

In addition, a first mounting portion 38 having a female screw mount and a second mounting portion 39 having a female screw mount are formed at the nosepiece 21. The deep ultraviolet light objective 19 is screwed in at the first mounting portion 38, whereas the visible light objective 20 is screwed in at the second mounting portion 39. It is to be noted that the objectives 19 and 20 are detachable lenses. Since the first mounting portion 38 and the second mounting portion 39 are symmetrical relative to the axis 21D, the objectives 19 and 20, too, are mounted at the respective mounting portions 38 and 39 achieving symmetry to each other relative to the axis 21D. A communicating hole 34C capable of communicating with the supply-side gas passage 34 at the supporting member 8 and a communicating hole 35C capable of communicating with the discharge-side gas passage 35 at the supporting member 8 are formed near the first mounting portion 38. It is to be noted that no communicating holes are formed near the second mounting portion 39.

As the nosepiece 21 is rotated relative to the supporting member 8 and thus the deep ultraviolet light objective 19 is inserted in the observation optical path L as shown in FIG. 3, the communicating hole 34C comes into communication with the supply-side gas passage 34 at the supporting member 8 via the opening 34B and the communicating hole 35C comes into communication with the discharge-side gas passage 35 via the opening 35B. As a result, the nitrogen gas is supplied to the deep ultraviolet light objective 19 and then is discharged so that the nitrogen gas circulates inside the deep ultraviolet light objective 19. It is to be noted that if the visible light objective 20 is inserted at observation optical path L by rotating the nosepiece 21, no nitrogen gas is supplied into the visible light objective 20 since no communicating holes are formed near the second mounting portion 39.

Next, the deep ultraviolet light objective 19 is explained in detail.

As shown in FIG. 3, the deep ultraviolet light objective 19 includes a cylindrical member 40 and a short sleeve portion 41, which projects out at the center at one end of the cylindrical member 40. A male screw portion 41A is formed at the external circumferential surface of the short sleeve portion 41. A light transmitting plate 42 achieving a sealing function is secured at the internal circumferential surface of the short sleeve portion 41 so as to prevent leakage of the nitrogen gas inside the deep ultraviolet light objective 19. By screwing male screw portion 41A into the first mounting portion 38 of the nosepiece 21, the deep ultraviolet light objective 19 is mounted at the nosepiece 21.

At one end of the cylindrical member 40, i.e. on the side corresponding to the nosepiece 21, a first flow path 43 communicating with the communicating hole 34C at the nosepiece 21 and a second flow path 44 communicating with the communicating hole 35C are formed. In addition, near the flow paths 43 and 44, a shutter 43A that opens/closes the first flow path 43 and a shutter 44A that opens/closes the second flow path 44 are respectively provided.

A cap-like lid member 45 with an opening formed at its center is mounted at the internal circumferential surface at the other end of the cylindrical member 40. A lens holder 45A, which holds a third lens 45B, is screwed into and retained at the internal circumferential surface of the lid member 45. Between the internal circumferential surface of the cylindrical member 40 and the external circumferential surface of the lid member 45, a ring-shaped shield member 50 is mounted. The shield member 50 prevents external air from entering the cylindrical member 40 through gaps between the external circumferential surfaces of lens holding rings to be detailed later and the internal circumferential surface of the cylindrical member 40.

A differential screw 46 is interlocked at the external circumferential surface of the cylindrical member 40 in order to adjust the position of the focal point of the deep ultraviolet light objective 19. A set screw (set screw) 47 that applies pressure to the external circumferential surface of the cylindrical member 40 is mounted at the differential screw 46. The set screw 47 is loosened while the differential screw 46 is operated. As shown in FIG. 3, a stage is formed at the external circumferential surface of the cylindrical member 40 so that the external diameter of the cylindrical member 40 at the other end is smaller than the external diameter of the cylindrical member 40 at the one end. Between the differential screw 46 and the external circumferential surface of the portion of the cylindrical member 40 with the smaller external diameter, a cap-shaped cap screw 48 with an opening at its center is mounted. While the differential screw 46 and the cap screw 48 interlock, their pitches are different from each other.

At a side surface of the cap screw 48, an oval hole 48A is formed with a pin 49 inserted therein. The pin 49 which passes through the hole 48A is secured at the cylindrical member 40. As the differential screw 46 is rotated, the pin 49 guides the cap screw 48 only along the optical axis L.

By rotating the differential screw 46 and thus moving the cap screw 48 slightly, the position of the focal point of the deep ultraviolet light objective 19 can be adjusted. The operator rotates the differential screw 46 while visually verifying the state of the focal point position adjustment via the eyepiece 11B. When the focal point position is adjusted, the differential screw 46 and the cap screw 48 are locked to the cylindrical member 40 by the set screw 47.

In the cylindrical member 40, a spring 51, a first lens holding ring 52, a second lens holding rings 53, a third lens holding ring 54 and a fourth lens holding ring 55 are housed. The first~fourth lens holding rings 52~55 and the lid member 45 are pressed against the cap screw 48 by the spring 51. As the differential screw 46 is rotated to slightly move the cap screw 48 along the optical axis L, the lens holding rings 52~55 are moved to specific positions to adjust the focal point position.

A fourth lens 52A is secured to the first lens holding ring 52 and also, a hole 52B through which the nitrogen gas flows is formed at the first lens holding ring 52. Likewise, a fifth lens 53A is secured to the second lens holding ring 53 having a hole 53B formed therein. A sixth lens 54A is secured to the third lens holding ring 54 having a hole 54B formed therein. In addition, a seventh lens 55A is secured to the fourth lens holding ring 55 having a hole 55B formed therein.

The lens holding rings 52~55 and the lenses 52A~55A secured to the individual lens holding rings are pressed toward the cap screw 48, i.e., against the lid member 45 by the spring 51. The individual lens holding rings 52~55 keep the lenses 52A~55A and the third lens 45B over predetermined distances from each other.

A gap 40A is formed between the inner wall surface at one end (on the upper side in FIG. 3) of the cylindrical member 40 and the first lens holding ring 52. A gap 52C is formed between the first lens holding ring 52 and the second lens holding ring 53, a gap 53C is formed between the second lens holding ring 53 and the third lens holding ring 54 and a gap 54C is formed between the third lens holding ring 54 and the fourth lens holding ring 55. In addition, a gap 55C is formed between the fourth lens holding ring 55 and the lens holder 45A.

These gaps 40A and 52C~55C are in communication via the holes 52B 55B formed at the individual lens holding rings 52~55. As a result, the nitrogen gas supplied from the communicating hole 34C of the nosepiece 21 via the flow path 43 is evenly and thoroughly distributed into the gaps 40A and 52C~55C. Then, contaminants and the nitrogen gas present within the deep ultraviolet light objective 19 can be discharged into the communicating hole 35C of the nosepiece 21 via the flow path 44. It is to be noted that the flow paths 43 and 44 at the deep ultraviolet light objective 19 are allowed to communicate with the communicating holes 34C and 35C respectively at the nosepiece 21 and that communicating holes 34C and 35C are allowed to communicate with the gas passages 34 and 35 respectively at the supporting member 8 as explained earlier.

In this structure, the gaps 40A and 52C~55C, the holes 52B~55B and the flow paths 43 and 44 constitute an inside K1 of the deep ultraviolet light objective 19. The space constituted of the inside of the lens barrel 9 described earlier, the inside K1 of the deep ultraviolet light objective 19 and the communicating holes 34C and 35C of the nosepiece 21 is referred to as an optical path sealed space K. It is to be noted that the inside of the lens barrel 9 is constituted of the first~fourth chambers 9A~9D. Namely, the optical path sealed space K does not include the range between the second light source 13 which emits visible light and the half-mirror 14. However, nitrogen gas may be supplied to the space between the second light source 13 and the half-mirror 14 by connecting the supply pipe 23 to the area between the second light source 13 and the half-mirror 14.

Now, the visible light objective 20 is explained. The visible light objective 20 adopts a basic structure similar to that of the deep ultraviolet light objective 19. The explanation below focuses on the features of the visible light objective 20 that differentiate it from the deep ultraviolet light objective 19.

The visible light objective 20 includes a cylindrical member 56 and a short sleeve portion 57 projecting out at the center of the cylindrical member 56 at one end of the cylindrical member 56. A male screw portion 57A is formed at the external circumferential surface of the short sleeve portion 57. However, no member equivalent to the light transmitting plate is provided at the visible light objective 20, since no nitrogen gas is supplied into the visible light objective 20 and thus there is no need to seal the visible light objective 20.

A first lens holding ring 58, a second lens holding ring 59, a third lens holding ring 60 and a fourth lens holding ring 61 are housed in the visible light objective 20. An eighth lens 58A, a ninth lens 59A, a tenth lens 60A and an eleventh lens 61A are secured to the first~fourth lens holding rings 58~61 respectively. No holes are formed at the first~fourth lens holding rings 58~61. The lens holding rings 58~61 and the lenses 58A~61A secured to the lens holding rings 58~61 constitute a lens assembly 62.

A spring mechanism 63, which elastically applies pressure to the lens assembly 62 along the radial direction, is mounted at a part of the external circumferential surface of the cylindrical member 56. A screwing mechanism 64 that locks the lens assembly 62 by pressing it toward the spring mechanism 63 is mounted at another part of the external circumferential surface of the cylindrical member 56. The position of the lens assembly 62 along the radial direction is adjusted by the spring mechanism 63 and the screwing mechanism 64.

When conducting a visible light observation by using the visible light objective 20, the nosepiece 21 is rotated and the visible light objective 20 is inserted into the observation optical path L.

The structure adopted in the ultraviolet microscope 1 has been explained in detail above. Now, the method adopted to charge the nitrogen gas into the optical path sealed space K constituted of the inside of the lens barrel 9, the deep ultraviolet light objective 19 and the communicating holes 34C and 35C is explained.

The ultraviolet microscope 1 is assembled within an atmosphere of air. For this reason, the optical path sealed space K is filled with air when the ultraviolet microscope 1 is first assembled. Contaminants that may photochemically react to the deep ultraviolet light emitted from the light source 12 may be contained in the air. Accordingly, by supplying nitrogen gas into the optical path sealed space K and discharging the contaminants, any photochemical reaction between the deep ultraviolet light and the contaminants is prevented.

Before supplying the nitrogen gas into the optical path sealed space K, the nosepiece 21 is rotated to insert the deep ultraviolet light objective 19 into the observation optical path L. At this point, the shutters 43A and 44A provided at the flow paths 43 and 44 of the deep ultraviolet light objective 19 should be in an open state.

The valve 22A is opened while the optical path sealed space K is filled with air and high-purity nitrogen gas is supplied from the gas source 22 through the supply pipe 23. At this time, the valves 23A~27A provided at the supply pipes 23~27 respectively and the valves 28A~32A provided at the discharge pipes 28~32 respectively should all be in an open state.

The nitrogen gas supplied from the gas source 22 is guided into the first~fourth chambers 9A~9D inside the lens barrel 9 via the supply pipes 24~27 and also is guided to the inside K1 of the deep ultraviolet light objective 19 via the supply pipe 23, the gas passage 34 and the communicating hole 34C. The air that has been filling the optical path sealed space K is discharged via the discharge pipes 28~32, the communicating hole 35C and the gas passage 35.

At a time point at which it is judged that the optical path sealed space K has become filled with nitrogen gas, i.e., that the air inside the optical path sealed space K has been completely replaced with nitrogen gas, the valves 23A~32A are all closed. It may be judged that the air inside the optical path sealed space K has been replaced with the nitrogen gas at a time point at which a predetermined length of time has elapsed after a nitrogen gas supply start, for instance.

The high-purity nitrogen gas is charged into the optical path sealed space K in this manner. Namely, the inside of the lens barrel 9 and the inside K1 of the deep ultraviolet light objective 19 become filled with the high-purity nitrogen gas. Since the inside of the lens barrel 9 is divided into the first~fourth chambers 9A~9D and the nitrogen gas is supplied into the individual chambers, an uneven distribution of the nitrogen gas is prevented.

The nitrogen gas may be charged into the optical path sealed space K in the following manner instead.

Before setting the deep ultraviolet light objective 19 in the observation optical path L, the valves 23A~32A are opened to supply the nitrogen gas into the lens barrel 9. When the air inside the lens barrel 9 is replaced with the nitrogen gas, the deep ultraviolet light objective 19 is set in the observation optical path L by rotating the nosepiece 21. As a result, the flow paths 43 and 44 at the deep ultraviolet light objective 19 become communicated with the supply pipe 23 and the discharge pipe 32. When the inside K1 of the deep ultraviolet light objective 19 has become filled with nitrogen gas, all the valves 23A~32A are closed. Thus, the air inside K1 of the deep ultraviolet light objective 19 is gradually replaced with nitrogen gas. Consequently, the nitrogen gas is evenly distributed through the inside K1 of the deep ultraviolet light objective 19 and the nitrogen gas is charged into the optical path sealed space K.

Alternatively, the deep ultraviolet light objective 19 may be mounted at the nosepiece 21 after filling the inside K1 of the deep ultraviolet light objective 19 with nitrogen gas in advance. The nitrogen gas is charged into the inside K1 of the deep ultraviolet light objective 19 in advance while the flow paths 43 and 44 are closed by the shutters 43A and 44A respectively. Before mounting the deep ultraviolet light objective 19 at the nosepiece 21, valves 23A~32A are opened to supply nitrogen gas into the lens barrel 9. When the lens barrel 9 becomes filled with the nitrogen gas, the valves 24A~31A are closed. Then, the deep ultraviolet light objective 19 filled with nitrogen gas is mounted at the nosepiece 21 and is set in the observation optical path L. By opening the shutters 43A and 44A, the flow paths 43 and 44 are made to communicate with the supply pipe 23 and the discharge pipe 32 respectively. The valves 23A and 32A are then closed. As a result, the air and the nitrogen gas are prevented from mixing with each other in an effective manner and it becomes possible to fill the inside K1 of the deep ultraviolet light objective 19 with the nitrogen gas quickly and evenly.

As explained above, filling the optical path sealed space K and, more specifically, the optical path in the illumination optical system 10 and the observation optical system 11 with a nitrogen gas atmosphere, a photochemical reaction between the deep ultraviolet light and contaminants can be prevented. As a result, the optical performance of the optical components does not become lowered and the service life of the optical components can be lengthened.

An example in which the valves 23A~27A at the supply pipes 23~27 respectively and the valves 28A~32A at the discharge pipes 28~32 respectively are closed to seal the optical path sealed space K after filling the optical path sealed space K with nitrogen gas has been explained above. However, the valves 23A~32A may be left in an open state, instead. Namely, nitrogen gas may be supplied into the optical path sealed space K constantly while the nitrogen gas is constantly discharged. In this case, even when contaminants remain in the optical path sealed space K or reaction products are formed through a photochemical reaction between the deep ultraviolet light and the remaining contaminants, they can be eliminated from the optical path atmosphere with a high degree of reliability. As a result, the observation environment in the ultraviolet microscope 1 can be maintained in an even more desirable state.

It is to be noted that the nitrogen gas, which is constantly discharged from the optical path sealed space K, may be collected by a nitrogen gas collecting mechanism. A compressor, for instance, may be provided at the ends of the discharge pipes 28~32 through which the nitrogen gas containing the contaminants passes. The contaminated nitrogen gas is compressed at the compressor and then is conveyed under pressure to and stored in a pressure container for collecting.

Second Embodiment

When conducting a high-resolution observation with a high NA (numerical aperture) by using deep ultraviolet light with a small wavelength as the light source in the ultraviolet microscope 1 described above, the focal depth is smaller than the focal depth in a visible light observation. For this reason defocusing may occur due to a very slight dimensional change in the ultraviolet microscope 1 caused by a disturbance such as a temperature change. Such defocusing degrades the observation environment.

Accordingly, the temperature of the nitrogen gas supplied into the optical path sealed space K in the ultraviolet microscope 1 explained earlier in reference to the first embodiment is controlled in the second embodiment. It is to be noted that for the temperature adjustment, the valves 23A~27A at the supply pipes 23~27 through which the nitrogen gas is supplied to the optical path sealed space K and the valves 28A~32A at the discharge pipes 28~32 through which the nitrogen gas is discharged from the optical path sealed space K are set in a fully open state. As a result, the nitrogen gas constantly flows into and constantly flows out of the optical path sealed space K.

Figure 4:
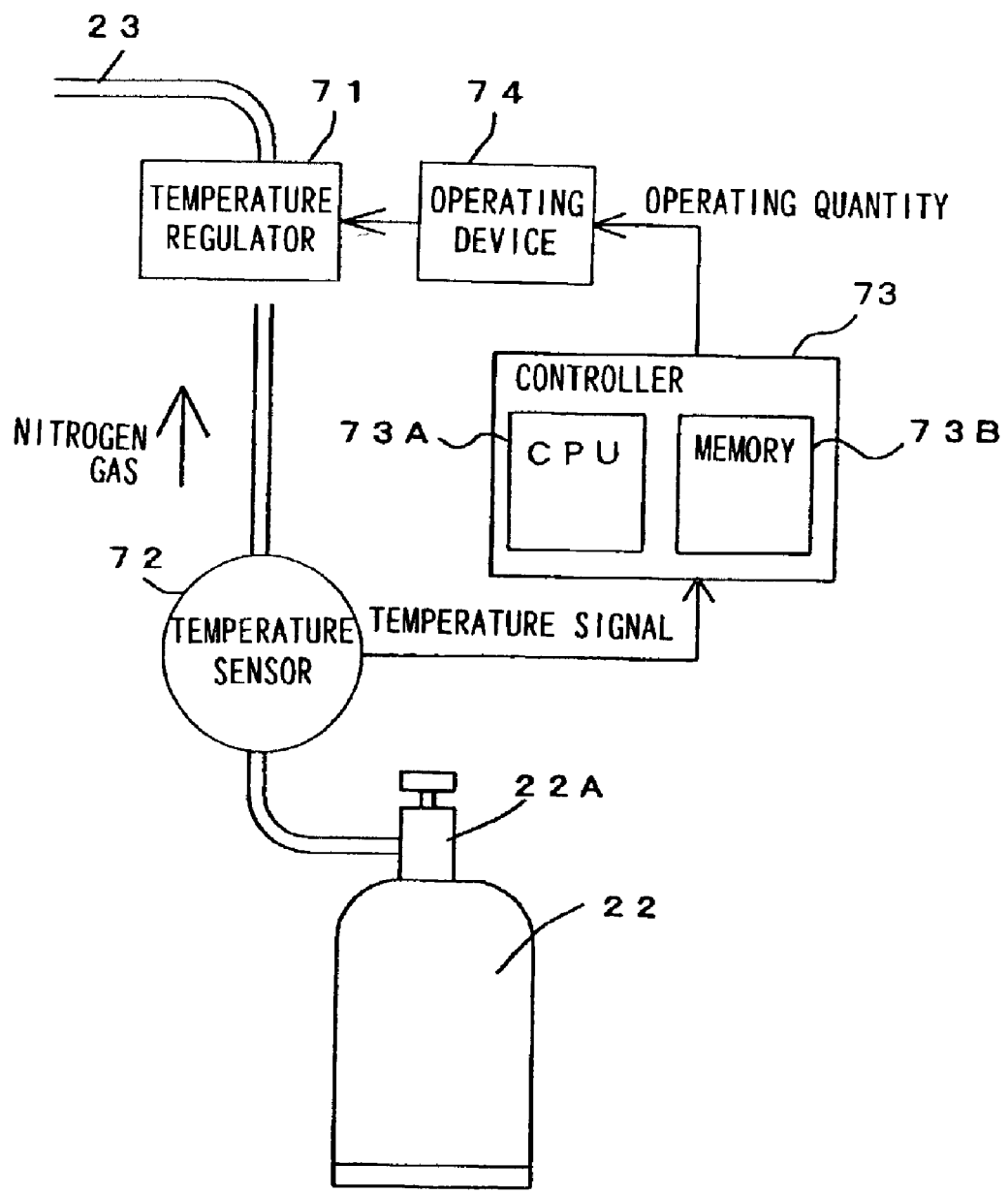
FIG. 4 is a block diagram showing the structure adopted in the nitrogen gas temperature control apparatus.

FIG. 4 is a block diagram showing the structure adopted in the nitrogen gas temperature control apparatus. It is to be noted that the structure of the ultraviolet microscope 1 is identical to that achieved in the first embodiment explained earlier in reference to FIGS. 1~3. As shown in FIG. 4, A temperature regulator 71 that adjusts the temperature of the nitrogen gas and a temperature sensor 72 that detects the temperature of the nitrogen gas are installed in the supply pipe 23. The temperature sensor 72 is connected to the input side of a controller 73. The output side of the controller 73 is connected with an operating device 74 which is provided in conjunction with the heat exchanger 71. It is to be noted that the temperature control apparatus comprises the heat exchanger 71, the temperature sensor 72, the controller 73 and the operating device 74.

The temperature regulator 71, which is constituted of, for instance, a heat exchanger having a cooling unit and a radiating unit, is provided at the supply pipe 23 at a position between the valve 22A mounted at the gas source 22 and a branching point at which the first branch supply pipe 24 is connected. The temperature sensor 72 is provided between the valve 22A and the heat exchanger 71, further toward the upstream side relative to the heat exchanger 71. The temperature of the nitrogen gas detected by the temperature sensor 72 is output to the controller 73.

The controller 73 includes a CPU 73A and a memory 73B. The controller 73 executes a program to be detailed later at the CPU 73A in response to a signal input from the temperature sensor 72 to calculate the operating quantity to which the operating device 74 needs to be operated to achieve a temperature adjustment. The operating device 74 maybe, for instance, a compressor that compresses the refrigerant in the heat exchanger 71. The controller 73 outputs the operating quantity that has been calculated to the compressor 74. The compressor 74 compresses the refrigerant in the heat exchanger 71 in response to the command issued by the controller 73. The heat exchanger 71 adjusts the temperature of the nitrogen gas in conformance to the operation at the compressor 74. It is to be noted that information such as the temperature setting for the nitrogen gas is stored in the memory 73B of the controller 73. The temperature setting for the nitrogen gas maybe, for instance, 20° C.

Figure 5:
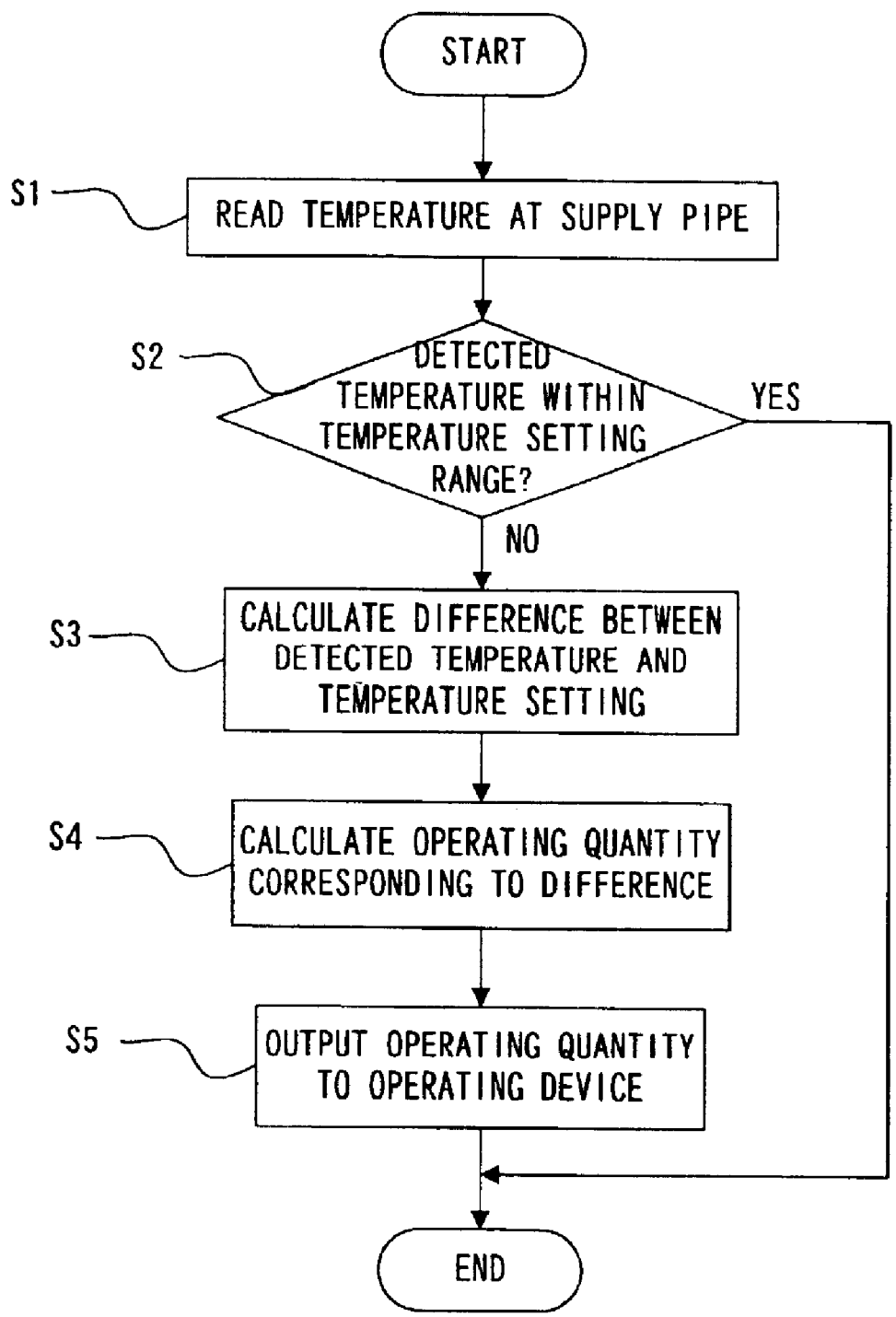
FIG. 5 presents a flowchart of the procedure of the processing executed in conformance to a nitrogen gas temperature control program at the temperature control apparatus.

The following is an explanation of the temperature control processing executed by the CPU 73A of the controller 73, given in reference FIG. 5. FIG. 5 presents a flowchart of the procedure of the processing executed in conformance to a temperature control program by the controller 73.

In step S1, the nitrogen gas temperature detected by the temperature sensor 72 is read. In step S2, a decision is made as to whether or not the nitrogen gas temperature read in step S1 is within a predetermined temperature setting range stored in the memory 73B. If an affirmative decision is made in step S2, the temperature of the nitrogen gas does not need to be adjusted and, accordingly, the processing ends. If, on the other hand, a negative decision is made in step S2, the operation proceeds to step S3.

In step S3, the difference between the detected temperature and a specific temperature setting stored in the memory 73B is calculated. Instep S4, the operating quantity for the compressor 74 is calculated in correspondence to the difference between the detected temperature and the temperature setting calculated in step S3. It is to be noted that the correct relationship that should be maintained between the difference between the detected temperature and the temperature setting and the operating quantity for the compressor 74 is determined in advance and stored in the memory 73B. In step S5, the operating quantity calculated in step S4 is output to the compressor 74. The compressor 74, in turn, compresses the refrigerant in the heat exchanger 71 at the operating quantity input from the CPU 73A and thus adjusts the temperature of the nitrogen gas.

As described above, the temperature of the nitrogen gas supplied from the gas source 22 is adjusted to a predetermined temperature setting and then the nitrogen gas is guided into the lens barrel 9 and the like. Since the supply-side valves 23A~27A and the discharge side valves 28A~32A are all in a fully open state, the nitrogen gas having undergone the temperature adjustment is allowed to flow into and to flow out of the optical path sealed space K constantly. As a result, even when the temperature changes in the environment surrounding the ultraviolet microscope 1, the temperature within the optical path sealed space K is sustained at the predetermined temperature. Thus, the extent of any dimensional change that may manifest at the ultraviolet microscope 1 due to a temperature change in the surrounding environment is reduced to prevent a degradation of the observation environment by minimizing defocusing.

Third Embodiment

Next, the ultraviolet microscope achieved in the third embodiment of the present invention is explained in reference to FIG. 6. The same reference numerals are assigned in FIG. 6 to components having functions similar to those in the first embodiment explained earlier in reference to FIGS. 1 and 2. The following explanation focuses on the features of the third embodiment that differentiate it from the first and second embodiments.

As shown in FIG. 6, the first~fifth discharge pipes 28~32 through which the nitrogen gas is discharged from the optical path sealed space K are connected to a return-side gas pipe 81. The trailing end of the return-side gas pipe 81 is connected to the supply pipe 23 via a gas force-feeder 82. The gas force-feeder 82 may be constituted of, for instance, a pump provided to supply the nitrogen gas in the return-side gas pipe 81 to the supply pipe 23. Namely, the nitrogen gas discharged from the optical path sealed space K passes through the return-side gas pipe 81 and is guided into the supply pipe 23 so as to flow into the optical path sealed space K again. In other words, the nitrogen gas is circulated.

In this structure, the supply pipe 23, the first~fourth branch supply pipes 24~27, the optical path sealed space K, the first~fifth discharge pipes 28~32 and the return-side gas pipe 81 constitute the circulating path through which the nitrogen gas is circulated. It is to be noted that the return-side gas pipe 81 is constituted of an extended portion of the fifth discharge pipe 32 as shown in FIG. 6.

A base pipe 22B through which nitrogen gas is guided to the gas pipe 81 is connected to the valve 22A mounted at the gas source 22. The base pipe 22 and the gas pipe 81 are connected via a connector 22C. A controller 87 that adjusts the temperature of the nitrogen gas and the like is mounted between the connector 22C and the gas force-feeder 82. The nitrogen gas temperature control implemented in the embodiment is to be detailed later.

A gas discharge valve 83 and a contaminant catching filter 84 are provided at the return-side gas pipe 81 at positions between the connecting points at which the gas pipe 81 is connected with the discharge pipes 28~31 and the connector 22C. The nitrogen gas inside the return-side gas pipe 81 can be discharged to the outside by opening the gas discharge valve 83. The contaminant catching filter 84 catches contaminants (including reaction products resulting from any photochemical reaction between contaminants and the deep ultraviolet light) contained in the nitrogen gas.

A temperature sensor 85 that detects the temperature of the nitrogen gas and a temperature regulator that adjusts the nitrogen gas temperature, constituted of, for instance, a heat exchanger 86, are installed at the gas pipe 81 between the connector 22C and the gas force-feeder 82. The gas temperature detected by the temperature sensor 85 is input to the controller 87. The controller 87 executes temperature control processing in conformance to a specific program by using the temperature signal input thereto. The results of the arithmetic operation performed by the controller 87 are output to a compressor 88. The compressor 88 compresses the refrigerant in the heat exchanger 86 in conformance to the signal provided by the controller 87 and thus adjusts the temperature of the nitrogen gas to match the temperature setting, e.g., 20° C. It is to be noted that the temperature sensor 85, the heat exchanger 86, the controller 87 and the like constitute the temperature control apparatus and the temperature control processing executed by the temperature control apparatus is similar to that achieved in the second embodiment.

When filling the optical path sealed space K with the nitrogen gas, the valves 23A~32A and the gas discharge valve 83 are set in an open state. The nitrogen gas from the gas source 22 is supplied to the supply pipe 23 via the gas force-feeder 82 and then flows into the optical path sealed space K. At this time, the mixture of the air which has been present in the optical path sealed space K and the nitrogen gas travels through the discharge pipes 28~32 and the return-side gas pipe 81 and is discharged through the gas discharge valve 83. After filling the optical path sealed space K with the nitrogen gas as in the first embodiment explained earlier, the gas discharge valve 83 is closed.

As the gas force-feeder 82 is driven, the nitrogen gas in the return-side gas pipe 81 is supplied to the supply pipe 23 and thus, the nitrogen gas is circulated through the circulating path. While contaminants sometimes remain in the nitrogen gas within the optical path sealed space K, the contaminants in the nitrogen gas flow out of the optical path sealed space K as the nitrogen gas circulates. The nitrogen gas containing the contaminants that has flowed out of the optical path sealed space K then passes through the contaminant catching filter 84 provided at the return-side gas pipe 81. As the nitrogen gas passes through the filter 84, the contaminants in the nitrogen gas are caught. Thus the contaminants remaining in the nitrogen gas are removed to further reduce the occurrence of a photochemical reaction between the deep ultraviolet light and the contaminants.

The temperature of the nitrogen gas from which the contaminants have been removed through the filter 84 is adjusted to a predetermined temperature level at the heat exchanger 86 as explained earlier, and the nitrogen gas having undergone the temperature adjustment travels through the supply pipe 23 to be supplied into the optical path sealed space K again. As a result, the temperature of the nitrogen gas in the optical path sealed space K is sustained the preset level even if a temperature change occurs in the environment surrounding the ultraviolet microscope 1, thereby minimizing the occurrence of a dimensional change in the ultraviolet microscope 1.

The following advantages are achieved in the third embodiment described above.

Since the nitrogen gas circulating path is formed with the supply pipe 23, the return-side gas pipe 81 and the like to circulate the nitrogen gas, contaminants remaining in the nitrogen gas can be eliminated from the lens barrel 9 and the like with a high degree of reliability. In addition, contaminants in the nitrogen gas can be caught at the contaminant catching filter 84 to remove the contaminants from the nitrogen gas with an even higher degree of reliability. As a result, the occurrence of a photochemical reaction between the deep ultraviolet light and the contaminants is minimized to effectively reduce clouding of the optical components caused by contaminants or reaction product adhering thereto so that the transmittance, i.e., their optical performance is not lowered. In addition, since the optical performance of the optical components is not readily lowered, the product life of the optical components can be lengthened.

Since the temperature of the nitrogen gas is adjusted by the temperature control apparatus to sustain it at a predetermined temperature setting, the occurrence of a dimensional change in the ultraviolet microscope 1 can be reduced even if a temperature change occurs in the surrounding environment. Thus, even during a high NA (numerical aperture) observation conducted by using light with a small wavelength, defocusing attributable to a dimensional change can be effectively prevented to maintain the observation environment in a desirable state.

While an explanation is given above in reference to the embodiments in which the illuminating light for the ultraviolet light observation is ultraviolet light in the deep ultraviolet range with a particularly small wavelength, the ultraviolet light observation may be conducted by using ultraviolet light with a wavelength outside the deep ultraviolet range as well. In addition, while an ultraviolet light observation and a visible light observation can be conducted through the ultraviolet microscope 1 by using ultraviolet light and visible light respectively, an ultraviolet light observation alone may be performed through the ultraviolet microscope 1. In such a case, the visible light illumination optical system 10B and the visible light objective 20 can be omitted and thus, the number of required parts is reduced.

Furthermore, while nitrogen gas is used as the inert gas which fills the lens barrel 9 and the like, the present invention is not limited to this example and helium gas, for instance, may be used instead. In other words, any inert gas may be used as long as a photochemical reaction between contaminants present in the optical path atmosphere in the ultraviolet light microscope 1 and the ultraviolet light can be effectively prevented.

It is to be noted that the nitrogen gas may be discharged from the ultraviolet light objective 19 at the end point thereof. A small hole, for instance, may be provided at the lid member 45 of the ultraviolet light objective 19 so that the nitrogen gas flows out from the objective 19 towards a specimen H. The shutter 44A is closed to maintain the state in which the nitrogen gas is not allowed to flow out to the flow path 44, the communicating hole 35C and the discharge-side gas passage 35. In this state, the nitrogen gas is supplied into the ultraviolet light objective 19 through the supply-side gas passage 34 and then is discharged from the small hole. In this manner, it is possible to eliminate the contaminants within the ultraviolet light objective 19. Furthermore, it is possible to prevent the specimen H from being damaged by a photochemical reaction between the ultraviolet light and the oxygen by supplying the nitrogen gas around the specimen H. As a result, the observation environment can be maintained in a further desirable state.

The above described embodiments are examples, and various modifications can be made without departing from the spirit and scope of the invention.

What is claimed is:

1. An ultraviolet microscope, comprising:
   a microscope main unit that houses an illumination optical system that guides ultraviolet light emitted from a light source to a specimen;
   a nosepiece provided at the microscope main unit that includes a first mounting portion at which an ultraviolet light objective for observing the specimen is detachably mounted, and a second mounting portion at which a visible light objective for observing the specimen is detachably mounted, and that switches between the ultraviolet light objective and the visible light objective; and
   an inert gas supply device that supplies an inert gas into the microscope main unit to fill an internal space of the microscope main unit with the inert gas, wherein:
   the nosepiece forms a circulating path through which the inert gas is supplied into and discharged from the ultraviolet light objective when the ultraviolet light objective is inserted at an observation optical path, and
   the nosepiece prevents the inert gas from being supplied into the visible light objective when the visible light objective is inserted at the optical observation path.

2. An ultraviolet microscope according to claim 1, wherein:
   the illumination optical system further guides visible light emitted from another light source to the specimen.

3. An ultraviolet microscope according to claim 2, wherein:
   the illumination optical system comprises the light source which emits the ultraviolet light and the another light source that emits the visible light.

4. An ultraviolet microscope according to claim 1, further comprising:
   a temperature control apparatus that controls temperature of the inert gas supplied into the ultraviolet light objective and the microscope main unit.

5. An ultraviolet microscope according to claim 4, wherein:
   the temperature control apparatus includes a temperature detector that detects the temperature of the inert gas supplied from the inert gas supply device into the microscope main unit and the ultraviolet light objective and a temperature regulator that adjusts the temperature of the inert gas, and drives the temperature regulator so as to adjust the temperature of the inert gas detected by the temperature detector to a reference temperature.

6. An ultraviolet microscope according to clam 5, wherein:
   the circulating path connects a supply pipe through which the inert gas is supplied from the inert gas supply device into the microscope main unit with a discharge pipe through which the inert gas is discharged from the microscope main unit to circulate the inert gas;
   the ultraviolet microscope further comprises:
      a circulating device provided at the circulating path, which circulates the inert gas; and
      a filter provided at the circulating path, which catches contaminants remaining in the inert gas.

7. An ultraviolet microscope according to claim 1, further comprising:
   a seal member provided between the nosepiece and a supporting member of the microscope main unit at which the nosepiece is mounted so as to prevent leakage of the inert gas.

8. An ultraviolet microscope according to claim 1, wherein: the inert gas is nitrogen gas.

9. An ultraviolet microscope according to claim 1, wherein:
   the ultraviolet light objective includes a plurality of lenses individually held by a holding frame and a lens body securing the holding frame, with a plurality of lens chambers formed between the plurality of lenses;
   a flow path communicating with a communicating hole of the circulating path formed at the nosepiece is provided at the lens body; and
   the plurality of lens chambers are made to communicate with each other through holes formed at the holding frame.

10. An ultraviolet microscope according to claim 9, wherein:

the ultraviolet light objective further includes a shutter that opens/closes the flow path.

11. An ultraviolet microscope, comprising:

an illumination optical system that guides ultraviolet light emitted from a light source to an objective;

an observation optical system that includes an ultraviolet light objective and an image-forming optical system;

a microscope main unit that houses the illumination optical system and the image-forming optical system;

a supply pipe through which an inert gas from a gas source is supplied into the microscope main unit;

a nosepiece rotatably mounted at the microscope main unit, that includes an ultraviolet mounting portion at which the ultraviolet light objective is detachably mounted, a visible light mounting portion at which a visible light objective is detachably mounted and a sliding surface that comes into contact with and slides against the microscope main unit;

a seal member provided between the sliding surface and the microscope main unit to prevent leakage of the inert gas;

a communicating hole formed near the ultraviolet mounting portion, through which the inert gas is guided into the ultraviolet light objective when the ultraviolet light objective is mounted at the ultraviolet mounting portion; and a gas passage formed at the microscope main unit that communicates with the supply pipe and is capable of communicating with the communicating hole, wherein:

when the ultraviolet light objective is set within an observation optical path and the communicating hole comes into communication with the gas passage, the inert gas is supplied into the ultraviolet light objective via the supply pipe, the communicating hole and the gas passage, and when the visible light objective is set within the observation optical path, the gas passage is blocked and the inert gas is not supplied into the visible light objective, with the communicating hole not being formed near the visible light mounting portion.

12. An ultraviolet microscope according to claim 11, wherein:

the illumination optical system further guides visible light emitted from another light source to the objective.

13. An ultraviolet microscope according to claim 12, wherein:

the illumination optical system comprises the light source which emits the ultraviolet light and the another light source that emits the visible light.

* * * * *